C. P. SCHWARZ.
LEAF SPRING.
APPLICATION FILED FEB. 4, 1916.

1,219,592.

Patented Mar. 20, 1917.

Inventor.
Constantine Proteus Schwarz,
by Wilhelm & Parker,
Attorneys.

UNITED STATES PATENT OFFICE.

CONSTANTINE PROTEUS SCHWARZ, OF CLEVELAND, OHIO.

LEAF-SPRING.

1,219,592.

Specification of Letters Patent.

Patented Mar. 20, 1917.

Application filed February 4, 1916. Serial No. 76,109.

*To all whom it may concern:*

Be it known that I, CONSTANTINE PROTEUS SCHWARZ, a citizen of the United States, residing at Cleveland, in the county of Cuyahoga and State of Ohio, have invented a new and useful Improvement in Leaf-Springs, of which the following is a specification.

This invention relates to improvements in leaf springs of the kind used on vehicles, buffers or draft gears for railroad cars or other purposes.

It is well known that a leaf spring has a certain amount of ability to absorb shocks due to the friction between the leaves, and that if the friction between the leaves is increased, the shock absorbing ability is increased so that the recoil of the spring is reduced.

The object of the invention is to provide a leaf spring of this kind of improved construction in which the shock absorbing ability of the spring is increased without materially increasing the weight of the spring. This is accomplished by placing layers or inserts of frictional material between the spring leaves so that the friction between the spring leaves and the inserts consumes the energy which would otherwise be used in causing a recoil of the spring, and by proportioning the inserts in such a manner that the recoil of the spring is substantially, if not entirely, eliminated.

Figure 1:
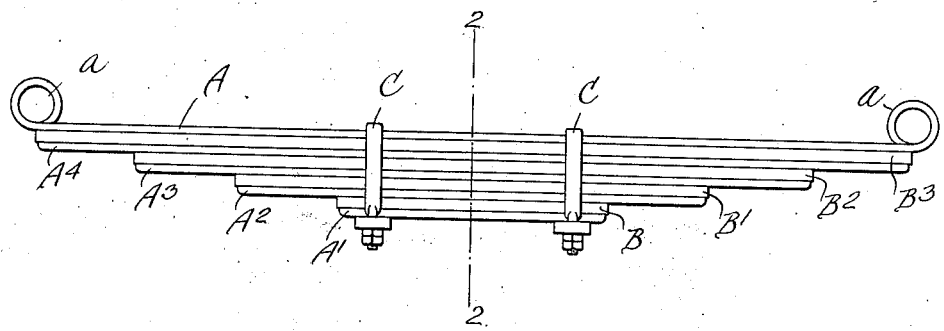
Figure 1 is a side elevation of a leaf spring embodying the invention.
Figure 2:
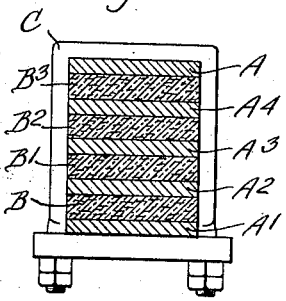
Fig. 2 is a transverse sectional elevation thereof, on an enlarged scale, on line 2—2, Fig. 1.

It is well known that energy is the product of force and distance traveled, and that force is the product of pressure and the co-efficient of friction, so that it may be said that the energy absorbed in a spring is the product of pressure, co-efficient of friction and distance traveled. This may be expressed in the following formula:

$$E = P.f.s.,$$

E representing the energy which must be absorbed by the spring to produce a periodicity, P the pressure acting on the engaging faces of the spring leaves and inserts, $f$ the co-efficient of friction, and $s$ the amount of relative movement between the engaging faces. Hence the energy absorbed in a spring may be increased by increasing the co-efficient of friction or by increasing the distance traveled, or in other words, the amount of movement between the parts of the spring. The construction shown in the drawings shows a spring constructed to have a large amount of movement between the parts of the spring so that substantially all of the energy stored in the spring when the same is subjected to a shock is dissipated while the spring is returning to its normal position.

A represents the upper leaf of a spring which may be provided with looped end portions or eyes $a$ for securing the spring to the usual shackles or bolts of a vehicle. $A'$ $A^2$ $A^3$ and $A^4$ represent the usual superimposed spring leaves of varying lengths secured together to form the leaf spring. B $B'$ $B^2$ and $B^3$ represent inserts or layers of frictional material which are placed between adjacent spring leaves. The inserts may be made of any suitable material which will not become disintegrated by the flexing or bending of the spring, such as leather, paper, fabric of any kind, fiber, wood, metal, or any other suitable material, but are preferably made of some light substance so as not to materially increase the weight of the spring. The thickness of the inserts determines to a certain extent the shock absorbing capacity of the spring since with thick inserts the relative movement of the spring leaves is greater than with thin ones. The thickness of the inserts in order to construct an aperiodic spring, depends largely upon the co-efficient of friction, but should be under ordinary conditions about one and one-half times the thickness of the spring leaves. The spring leaves and inserts may be secured together by any suitable means, such, for example, as clips or shackles C.

In the leaf spring described, the relative displacement between the contacting parts of the spring leaves and inserts is increased by increasing the thickness of the inserts, and consequently the energy absorbed by the spring is also increased. The increased shock absorbing ability of the spring may thus be obtained by increasing the size or bulk of the spring with very small increase in weight. The friction between the spring leaves and the inserts also tends to stiffen the spring somewhat, so that somewhat lighter spring leaves may be used, when the spring is provided with inserts than could otherwise be used. In producing a spring of this kind, the shock absorbing ability of the same can easily be varied by changing the thickness of the inserts. In this manner it is possible to produce in springs of this kind any desired degree of shock absorption.

I claim as my invention:

1. A leaf spring comprising a plurality of spring leaves, and layers of frictional material inserted between adjacent spring leaves differing in character from the spring leaves, said layers being of greater thickness than the leaves of said spring to cause a large relative movement of the component parts of the spring.

2. A leaf spring comprising a plurality of spring leaves, and layers of frictional material inserted between adjacent spring leaves differing in character from the spring leaves to increase the relative displacement of the contacting parts of the spring when deflected, said layers being of a thickness substantially one and one-half times the thickness of the leaves.

3. A leaf spring having a plurality of spring leaves and in which said leaves are separated by layers of flexible material of lower specific gravity than the leaves, said layers being free at their ends to move longitudinally with regard to said leaves and increasing the bulk of the spring to produce a large and unrestricted relative movement between the parts of the spring without materially increasing the weight of the spring, said layers being sufficiently flexible so that said layers of themselves offer substantially no material resistance to the deflections of the spring.

Witness my hand, this 1st day of February, 1916.

CONSTANTINE PROTEUS SCHWARZ.

Witnesses:
FLEMING H. CREW,
DWIGHT E. WERTZ.